US010808718B2

United States Patent
Hui et al.

(10) Patent No.: US 10,808,718 B2
(45) Date of Patent: Oct. 20, 2020

(54) FAN BLADE COMPOSITE SEGMENTS

(71) Applicant: UNITED TECHNOLOGIES CORPORATION, Farmington, CT (US)

(72) Inventors: Kwan Hui, Tucker, GA (US); Michael A. Weisse, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 422 days.

(21) Appl. No.: 15/032,900

(22) PCT Filed: Oct. 9, 2014

(86) PCT No.: PCT/US2014/059895
§ 371 (c)(1),
(2) Date: Apr. 28, 2016

(87) PCT Pub. No.: WO2015/099861
PCT Pub. Date: Jul. 2, 2015

(65) Prior Publication Data
US 2016/0252104 A1  Sep. 1, 2016

Related U.S. Application Data

(60) Provisional application No. 61/897,685, filed on Oct. 30, 2013.

(51) Int. Cl.
*F04D 29/38* (2006.01)
*F01D 5/14* (2006.01)
(Continued)

(52) U.S. Cl.
CPC ........... *F04D 29/388* (2013.01); *F01D 5/147* (2013.01); *F01D 5/282* (2013.01); *F04D 29/023* (2013.01);
(Continued)

(58) Field of Classification Search
CPC ......... F01D 5/147; F01D 5/282; F04D 29/388
See application file for complete search history.

(56) References Cited

U.S. PATENT DOCUMENTS 5,634,771 A  6/1997  Howard et al.
5,725,355 A  3/1998  Crail
(Continued)

FOREIGN PATENT DOCUMENTS

| EP | 0926312 A2 | 6/1999 |
| EP | 2243929 A2 | 10/2010 |
| WO | 20140312203 A2 | 2/2014 |

OTHER PUBLICATIONS

International Search Report for International Application No. PCT/US2014/059895; International filing date: Oct. 9, 2014; dated Jul. 17, 2015; 5 pgs.

(Continued)

*Primary Examiner* — Kenneth Bomberg
*Assistant Examiner* — Michael L Sehn
(74) *Attorney, Agent, or Firm* — Cantor Colburn LLP

(57) ABSTRACT

A fan blade includes a blade body, a composite segment and a cover. The blade body extends from a blade root to an opposed blade tip along a longitudinal axis. The blade body defines a leading edge and a trailing edge. A first airfoil surface extends from the leading edge to the trailing edge. A pocket is defined between the leading edge, the trailing edge, the blade root and the blade tip. The pocket has a bottom surface that opposes the first airfoil surface across the blade body. The composite segment is disposed in the pocket. The cover is mounted to the composite segment and to the blade body to form a second airfoil surface opposed to the first airfoil surface.

6 Claims, 3 Drawing Sheets

(51) Int. Cl.
*F01D 5/28* (2006.01)
*F04D 29/02* (2006.01)
*F04D 29/32* (2006.01)

(52) U.S. Cl.
CPC ........ *F04D 29/325* (2013.01); *F05D 2220/36* (2013.01); *Y02T 50/672* (2013.01)

(56) References Cited

U.S. PATENT DOCUMENTS

| | | | |
|---|---|---|---|
| 5,797,182 A | 8/1998 | Furlan | |
| 5,839,882 A | 11/1998 | Finn et al. | |
| 6,039,542 A * | 3/2000 | Schilling | F01D 5/16 416/224 |
| 6,364,616 B1 | 4/2002 | Stevenson | |
| 6,979,180 B2 * | 12/2005 | Motherwell | F01D 5/147 416/229 R |
| 6,994,525 B2 | 2/2006 | Weisse | |
| 7,334,333 B2 | 2/2008 | Palazzini | |
| 7,334,997 B2 | 2/2008 | Karafillis | |
| 7,980,817 B2 | 7/2011 | Foose | |
| 8,182,233 B2 * | 5/2012 | Goldfinch | B21D 53/78 416/229 R |
| 8,585,368 B2 * | 11/2013 | Viens | F01D 5/147 416/191 |
| 8,763,360 B2 | 7/2014 | Murdock | |
| 9,556,745 B2 | 1/2017 | Papin | |
| 9,920,650 B2 | 3/2018 | Hyatt | |
| 9,957,824 B2 | 5/2018 | Klinetob | |
| 10,060,266 B2 | 8/2018 | Cosby | |
| 10,371,165 B2 | 8/2019 | Weisse et al. | |
| 2002/0159882 A1 | 10/2002 | Crall | |
| 2005/0254955 A1 | 11/2005 | Helder et al. | |
| 2007/0292274 A1 | 12/2007 | Burdgick et al. | |
| 2010/0209235 A1 | 8/2010 | Shim | |
| 2010/0266415 A1 | 10/2010 | Viens et al. | |
| 2011/0211965 A1 | 9/2011 | Deal et al. | |
| 2013/0078107 A1 | 3/2013 | Weisse et al. | |
| 2013/0108470 A1 * | 5/2013 | Weisse | F01D 5/147 416/97 R |
| 2013/0164145 A1 | 6/2013 | Papin | |
| 2013/0167555 A1 | 7/2013 | Schwarz et al. | |
| 2014/0170435 A1 | 6/2014 | Hui | |
| 2015/0044052 A1 | 2/2015 | Worth | |
| 2015/0267541 A1 | 9/2015 | Hui | |
| 2016/0265548 A1 * | 9/2016 | Weisse | F04D 29/023 |

OTHER PUBLICATIONS

International Written Opinion for International Application No. PCT/US2014/059895; International filing date: Oct. 9, 2014; dated Jul. 17, 2015; 8 pgs.
European Search Report Application No. EP 14 87 4995.
European Search Report for Application No. 14876029.1; dated Oct. 17, 2017 (6 pages).
International Search Report for International Application No. PCT/US2014/059897; International filing date: Oct. 9, 2014; dated Jul. 17, 2015; 5 pgs.
Written Opinion for International Application No. PCT/US2014/059897; International filing date: Oct. 9, 2014; dated Jul. 17, 2015; 5 pgs.

* cited by examiner

FAN BLADE COMPOSITE SEGMENTS

RELATED APPLICATIONS

This application claims the benefit of and priority to U.S. Provisional Patent Application No. 61/897,685 filed Oct. 30, 2013, the contents of which are incorporated herein by reference in their entirety.

BACKGROUND OF THE INVENTION

1. Field of the Invention

The present disclosure relates to fan blades, and more particularly to fan blade assemblies for gas turbine engines, for example.

2. Description of Related Art

Traditionally, a turbo fan engine for an aircraft has a turbine that drives fan blades to draw air into the engine as the turbine rotates. The fan blades are exposed to the atmosphere in front of the engine and have the potential for an impact with birds or other foreign objects that may be drawn into the engine.

It is known that fan blades can be made out of titanium or aluminum. Traditional titanium fan blades are relatively strong, but they are heavy and expensive to manufacture. In order to reduce weight without sacrificing strength, it is known to machine out pockets from a titanium fan blade and adhere a cover to the fan blade. However, impact with a bird or other foreign object, as described above, can damage the blade and cover and lead to premature failure.

Such conventional methods and systems have generally been considered satisfactory for their intended purpose. However, there is still a need in the art for blade assemblies that allow for improved impact resistance. The present disclosure provides a solution for these problems.

SUMMARY OF THE INVENTION

A fan blade includes a blade body, a composite segment and a cover. The blade body extends from a blade root to an opposed blade tip along a longitudinal axis. The blade body defines a leading edge and a trailing edge, a first airfoil surface extending from the leading edge to the trailing edge, and a pocket defined between the leading edge, the trailing edge, the blade root and the blade tip. The pocket has a bottom surface that opposes the first airfoil surface across the blade body. The composite segment is disposed in the pocket. The cover is mounted to the composite segment and to the blade body to form a second airfoil surface opposed to the first airfoil surface.

It is contemplated that a composite segment can be adhered to the bottom surface of the pocket and/or adhered to the cover to resist forces acting on the cover in order to secure the cover to the blade body. Further, the pocket of the blade body can be at least partially filled with lightweight filler material. The cover can include a composite material, and/or titanium. The blade body can include titanium. In addition, a clearance can be defined between the composite segment and each of a leading edge side of the pocket and a trailing edge side of the pocket and/or a clearance can be defined between the composite segment and a pocket perimeter. The clearance can be configured to provide flexibility to the cover when forces are acting on the cover decreasing the likelihood that the cover will disbond from the blade body. It is further contemplated that blade body can include a recessed lip defined around its perimeter. An interior surface of the cover can be adhered to the blade body on the recessed lip. The recessed lip can be configured to allow the cover to be mounted flush with the blade body.

In certain embodiments, the composite segment can be a first composite segment. The fan blade can include at least one additional composite segment to form a plurality of composite segments. The plurality of composite segments can be adhered to the bottom surface of the pocket, and/or can be adhered to the cover to resist forces, as described above. Further, a clearance can be defined between the plurality of composite segments and each of a leading edge side of the pocket and a trailing edge side of the pocket, and/or a clearance can be defined between the plurality of composite segments and a pocket perimeter. In addition, there can be at least one clearance separation between each of the plurality of composite segments and the others.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
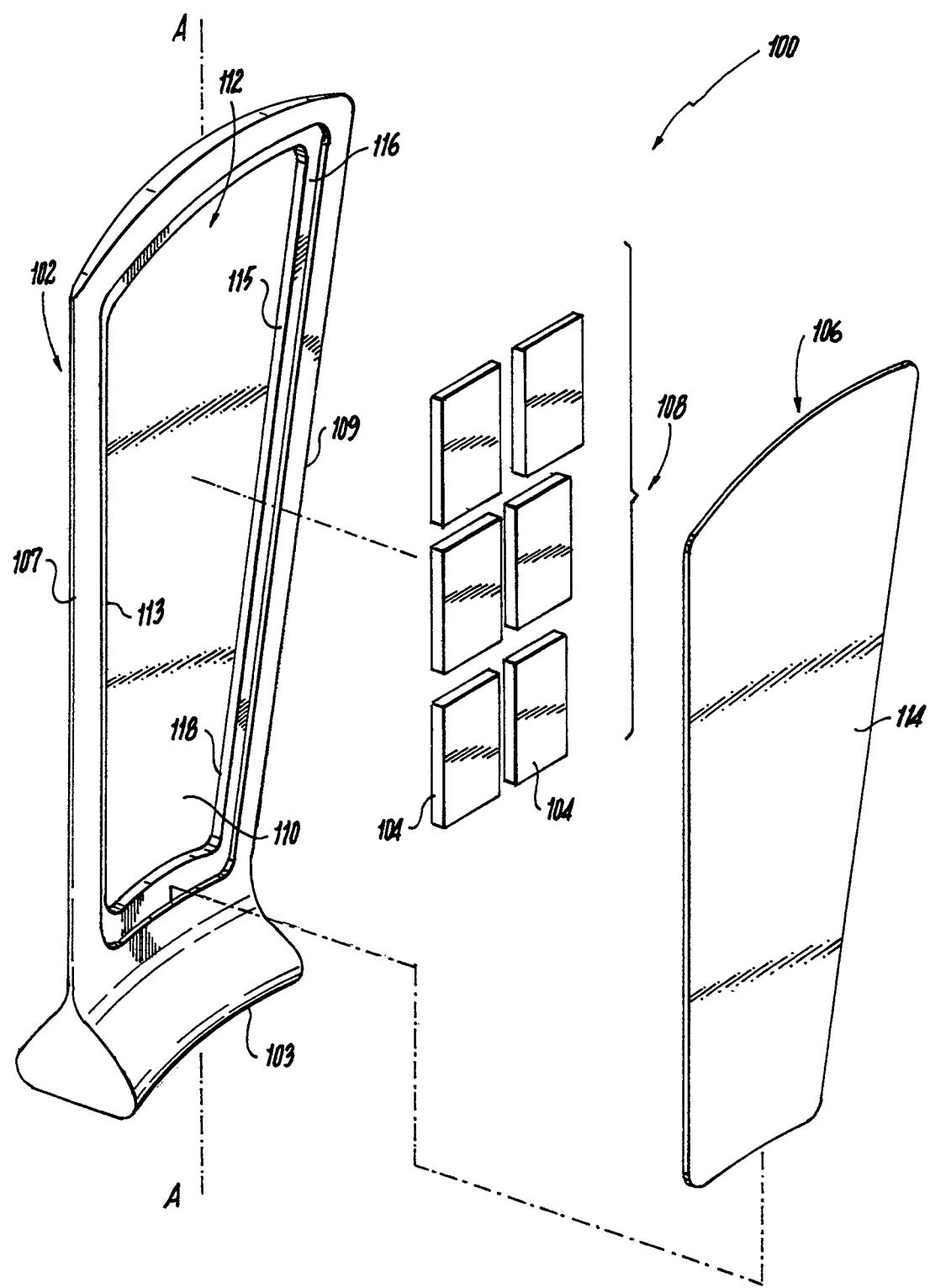
FIG. 1 is a is a perspective exploded view of an exemplary embodiment of a fan blade constructed in accordance with the present disclosure, showing a plurality of composite segments between the blade body and the cover.

Reference will now be made to the drawings wherein like reference numerals identify similar structural features or aspects of the subject disclosure. For purposes of explanation and illustration, and not limitation, a partial view of an exemplary embodiment of the fan assembly in accordance with the disclosure is shown in FIG. 1 and is designated generally by reference character 100. Other embodiments of fan blades in accordance with the disclosure, or aspects thereof, are provided in FIGS. 2-3, as will be described.

Figure 2:
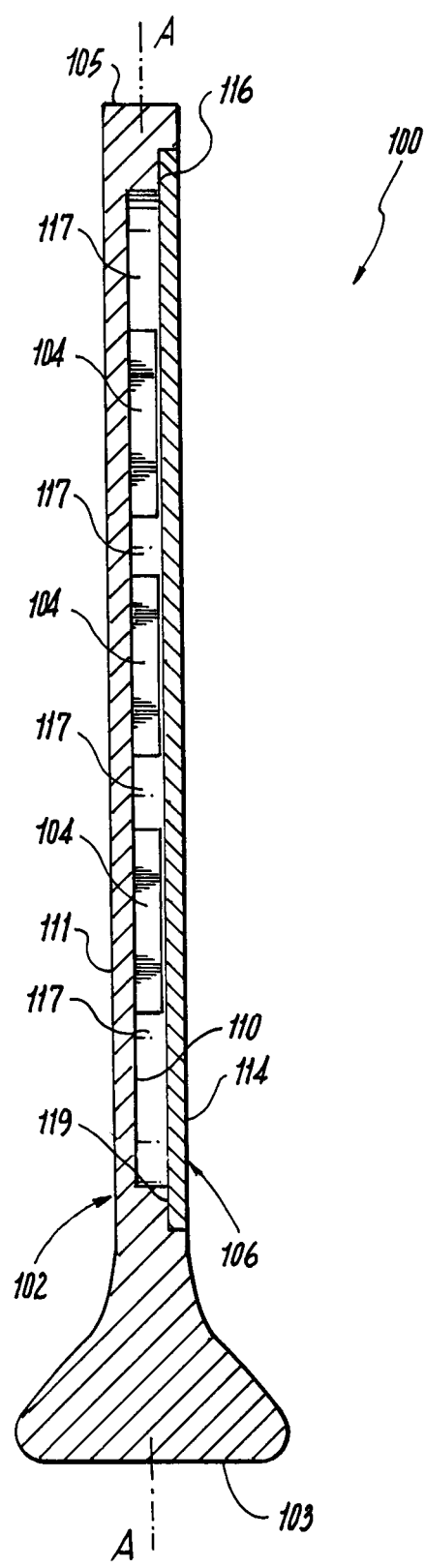
FIG. 2 is a cross-sectional side-elevation view the fan blade shown in FIG. 1, showing the first and second airfoil surfaces and the composite segments.

As shown in at least FIGS. 1 and 2, a fan blade 100 includes a blade body 102, composite segments 104 form a plurality of composite segments 108, and a cover 106. Blade body 102 extends from a blade root 103 to an opposed blade tip 105 along a longitudinal axis A. Blade body 102 defines a leading edge 107 and a trailing edge 109, a first airfoil surface 111, shown in FIG. 2, extending from leading edge 107 to trailing edge 109, and a pocket 112 defined between leading edge 107, trailing edge 109, blade root 103 and blade tip 105. Pocket 112 has a bottom surface 110 that opposes the first airfoil surface across blade body 102. Composite segments 104 are disposed in pocket 112. While shown and described herein as having one pocket 112, those skilled in the art will readily appreciate that blade body 102 can have multiple pockets 112.

Now with reference to FIG. 2, cover 106 is mounted to composite segments 104 and to blade body 102 to form a second airfoil surface 114 opposed to first airfoil surface 111. Blade body 102 includes a recessed lip 116 defined around its perimeter. An interior surface 119 of cover 106 is adhered to blade body 102 on recessed lip 116. Recessed lip 116 is configured to allow cover 106 to be mounted flush with blade body 102. It is contemplated that cover 106 can be a composite material and/or titanium, and that blade body 102 can include titanium. Those skilled in the art will readily appreciate that, in addition to composite segments 104, pocket 112, shown in FIG. 1, of blade body 102 can be at least partially filled with lightweight filler material which may be any type of numerous fillers.

Figure 3:
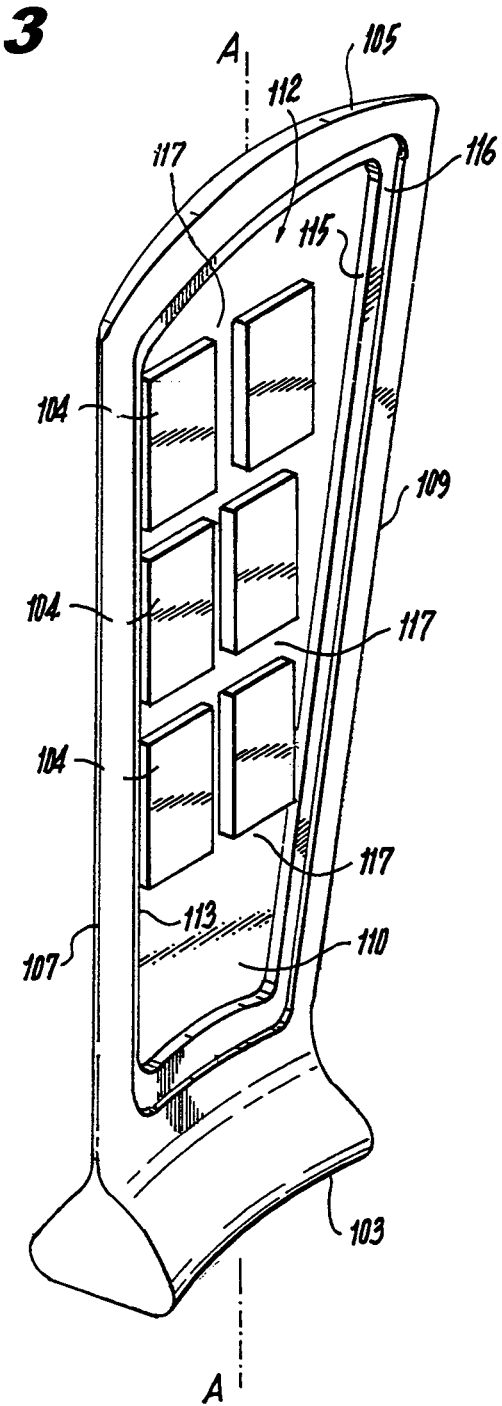
FIG. 3 is a is partial perspective view the fan blade shown in FIG. 1, showing the composite segments adhered to the bottom surface of the pocket, and the clearance between the composite segments and the pocket perimeter.

As shown in at least FIGS. 1 and 3, a plurality of composite segments 108 is adhered to the bottom surface of pocket 112. Composite segments 108 are adhered to cover 106, as shown in FIG. 2, to resist forces acting on cover 106 in order to secure cover 106 to blade body 102. A clearance 117 is defined between composite segments 108 and each of a leading edge side 113 of pocket 112 and a trailing edge side 115 of pocket 112. Clearance 117 is also defined between composite segments 108 and a pocket perimeter 118. In addition, there is a clearance 117 defined between each composite segment 104 separately there from one another. In other words, composite segments 108 are disjointed from one another and from the pocket perimeter 118 of blade 102. This lends flexibility while providing enhanced adhesive surface area. Those skilled in the art will readily appreciate that clearance 117 can be a variety of sizes as suitable for a given application.

Those skilled in the art will readily appreciate that clearance 117 can be configured to provide flexibility to cover 106 when forces are acting on cover 106 decreasing the likelihood that cover 106 will disbond from blade body 102. It is contemplated that composite segments 104 can be manufactured in a variety of ways as suitable for a given application, for example, machined chopped fiber or molded unitape. Further, those skilled in the art will also readily appreciate that composite segments 104 have sufficient tensile strength such that the composite segments 104 will not crack into pieces in case of impact, for example, a bird strike. While described and shown herein as fan blade composite segments 108, those skilled in the art will readily appreciate that composite segments 108 can be used in a variety of turbo-machine blades.

The methods and systems of the present disclosure, as described above and shown in the drawings, provide for fan blade assemblies with superior properties including improved impact resistance. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A fan blade, comprising:
   a blade body extending from a blade root to a blade tip along a longitudinal axis, wherein the blade body defines a leading edge and a trailing edge, a first airfoil surface extending from the leading edge to the trailing edge, the blade body being formed from a first material;
   a pocket defined in the blade body and located between the leading edge, the trailing edge, the blade root and the blade tip;
   a plurality of composite segments disposed in the pocket and separately adhered to a bottom surface of the pocket, the plurality of composite segments being formed from a second material, the second material being different from the first material;
   a clearance defined between each of the plurality of composite segments and between the plurality of composite segments and each of a leading edge side of the pocket, a pocket perimeter and a trailing edge side of the pocket such that the plurality of composite segments are disjointed from one another; and
   a separate cover separately mounted to the plurality of composite segments and to the blade body to form a second airfoil surface, wherein the clearance between each of the plurality of composite segments and between the plurality of composite segments and each of a leading edge side of the pocket, a pocket perimeter and a trailing edge side of the pocket is configured to provide flexibility to the separate cover.

2. A fan blade as recited in claim 1, wherein the bottom surface opposes the first airfoil surface across the blade body.

3. A fan blade as recited in claim 1, wherein the plurality of composite segments are adhered to the separate cover to resist forces acting on the separate cover in order to secure the separate cover to the blade body.

4. A fan blade as recited in claim 1, wherein the blade body includes a recessed lip defined around a perimeter of the pocket.

5. A fan blade as recited in claim 4, wherein an interior surface of the separate cover is adhered to the blade body on the recessed lip, and the recessed lip is configured to allow the separate cover to be mounted flush with the blade body.

6. A fan blade as recited in claim 1, wherein the pocket of the blade body is at least partially filled with lightweight filler material.

* * * * *